Figure 1:
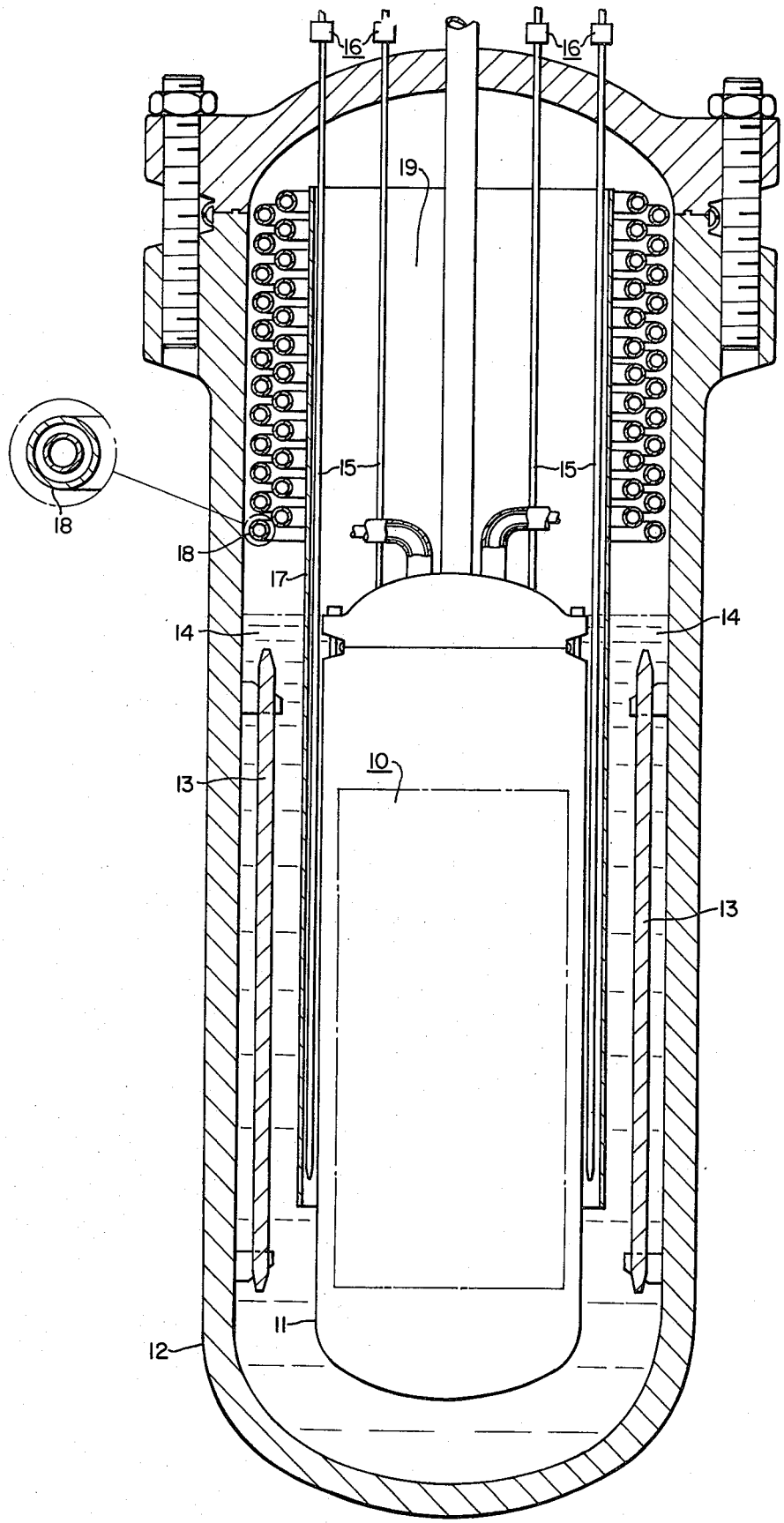
Figure 2:
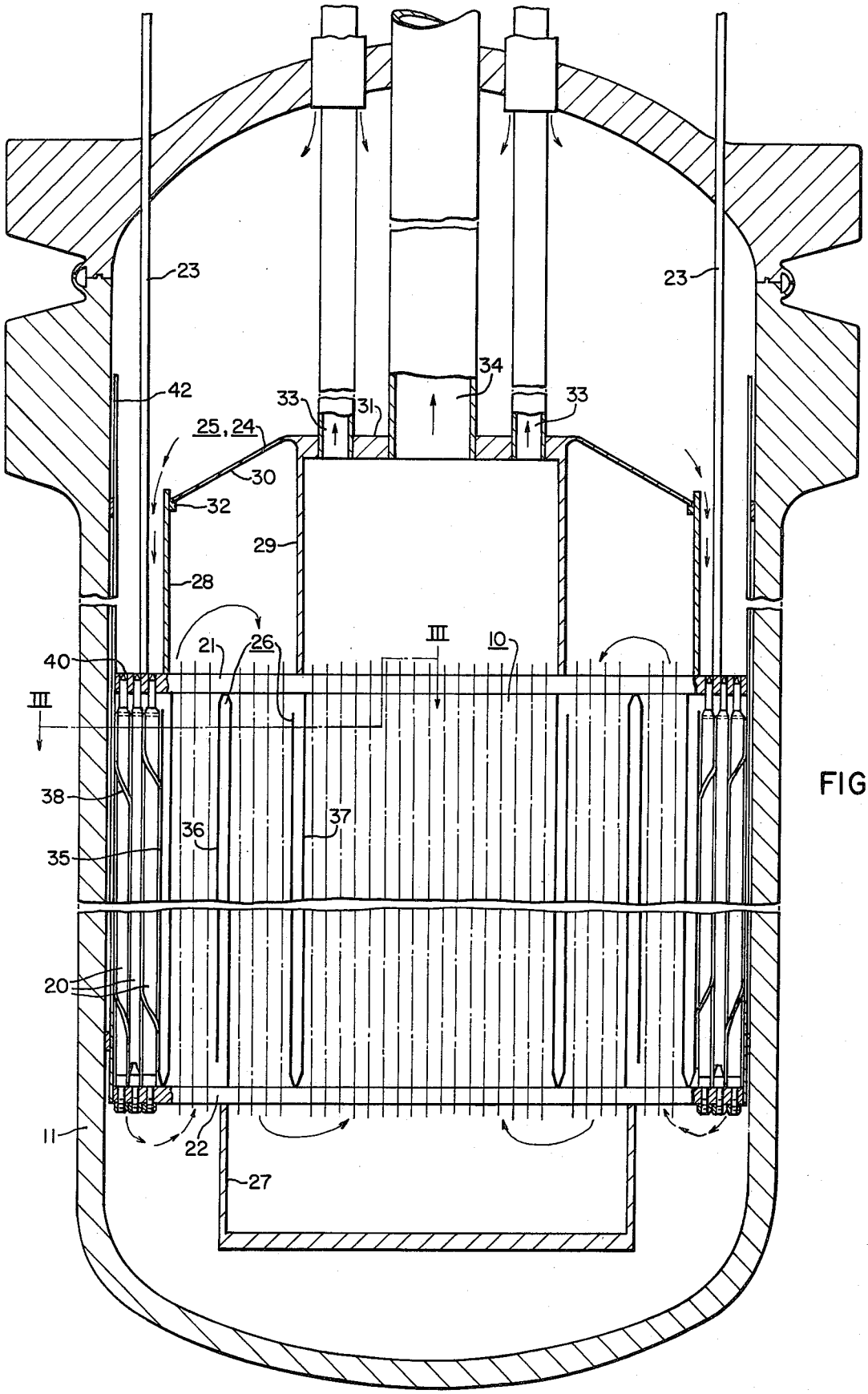
Figure 3:
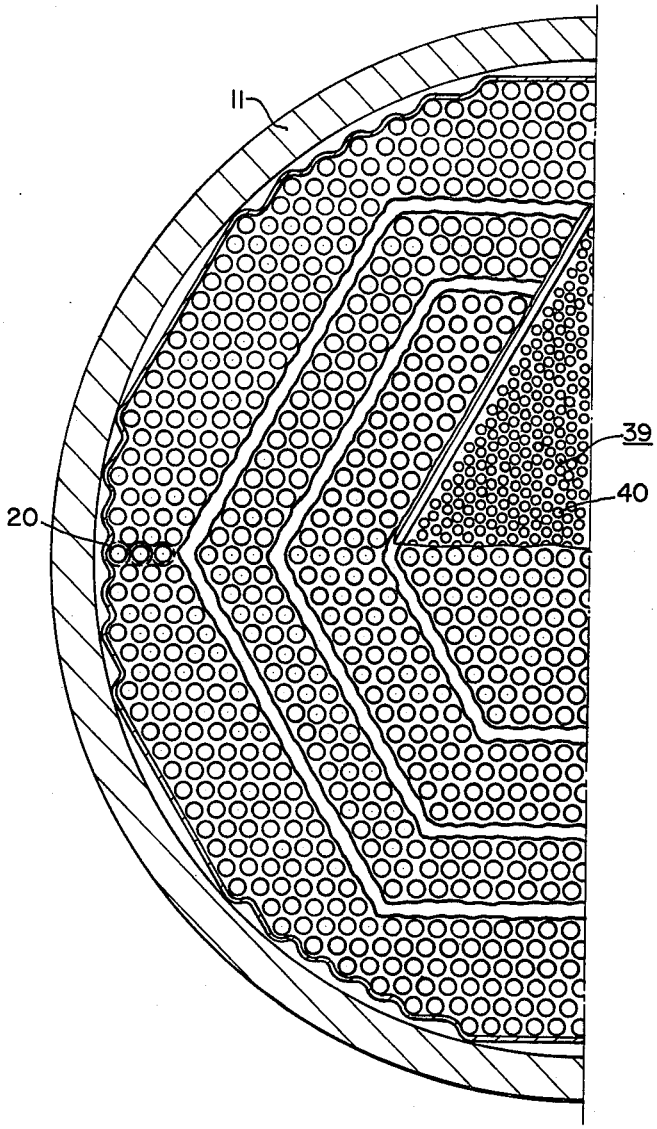
Figure 5:
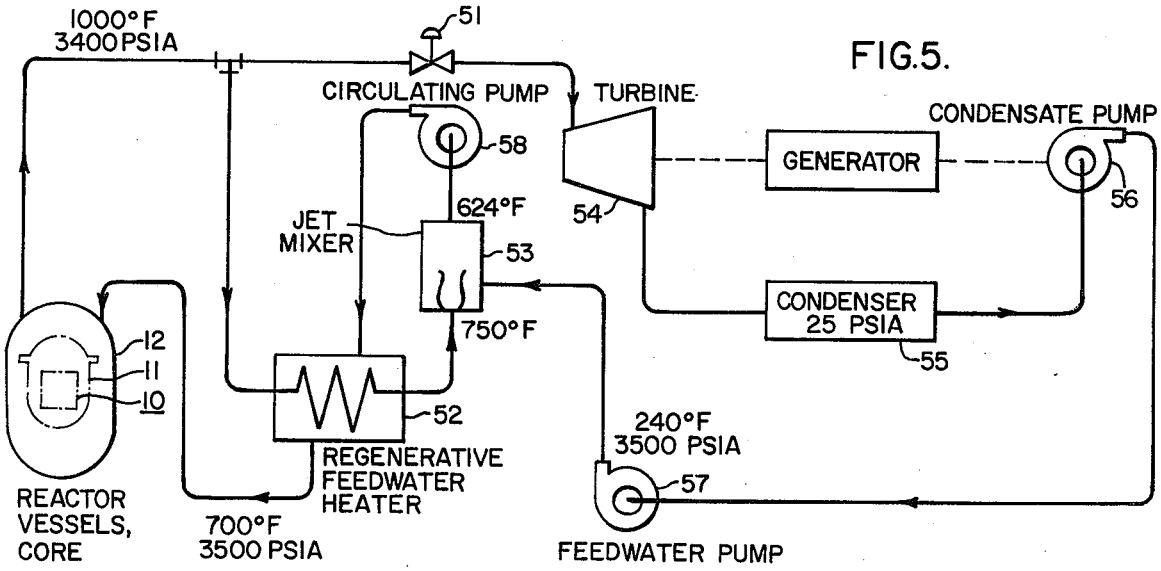
Figure 4:
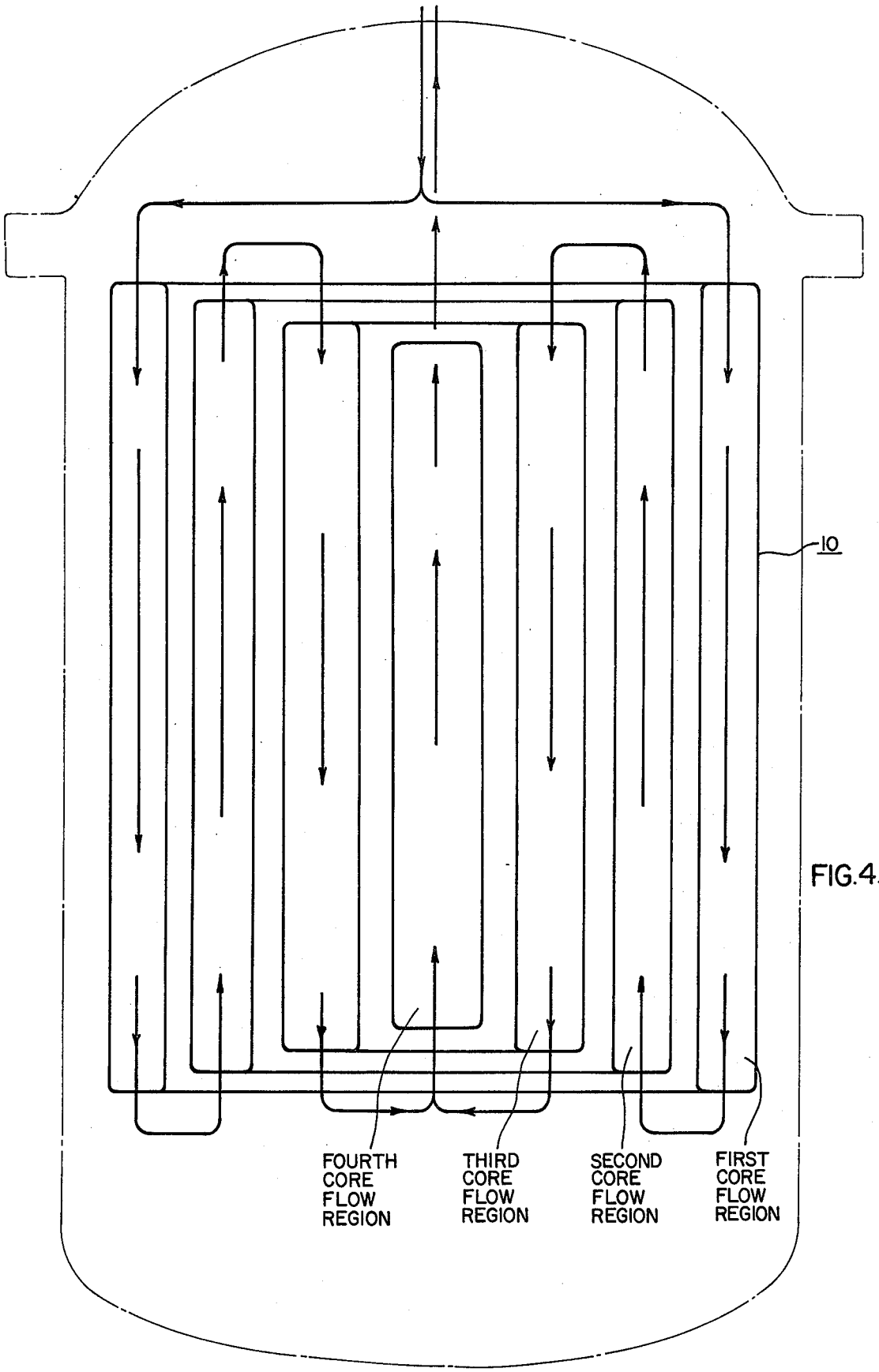

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 7

T939,002
EPITHERMAL NUCLEAR REACTOR

John F. Patterson, Richland, Wash., and Wilfred H. Comtois, Pittsburgh, Pa., assignors to Westinghouse Electric Corporation, Pittsburgh, Pa.

Filed Apr. 18, 1973, Ser. No. 352,372
Int. Cl. G21c *15/02*
U.S. Cl. 176—61
4 Sheets Drawing. 17 Pages Specification

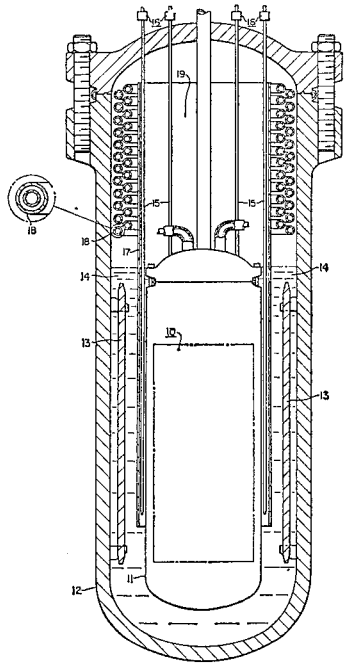

A supercritical nuclear reactor is disclosed having a core which includes fuel elements containing a mixture of beryllium oxide and enriched uranium. The combination of beryllium oxide in the fuel and the reactor coolant, comprising light water, provides nuclear moderation such that the reactor operates within the epithermal energy spectrum. The reactor coolant achieves operating conditions by making three or more passes through the nuclear core. Reactor control is accomplished by boron carbide control rods located within the nuclear core.